United States Patent
Husth

(10) Patent No.: US 7,426,245 B2
(45) Date of Patent: Sep. 16, 2008

(54) DC COMPENSATION IN DIRECT CONVERSION RADIO RECEIVERS

(75) Inventor: Arne Husth, Hellerup (DK)

(73) Assignee: Nokia Mobile Phones Limited, Espoo (FI)

( * ) Notice: Subject to any disclaimer, the term of this patent is extended or adjusted under 35 U.S.C. 154(b) by 1232 days.

(21) Appl. No.: 09/923,242

(22) Filed: Aug. 3, 2001

(65) Prior Publication Data

US 2002/0064239 A1    May 30, 2002

(30) Foreign Application Priority Data

Aug. 24, 2000    (GB) .................. 0020959.3

(51) Int. Cl.
*H04L 25/06* (2006.01)
*H04L 25/10* (2006.01)

(52) U.S. Cl. ............... 375/319; 375/324; 375/340; 375/350

(58) Field of Classification Search .......... 375/319, 375/149, 219, 343, 346, 348, 350, 31, 284, 375/233, 340, 324; 455/278.1, 296, 317, 455/324, 126; 372/31
See application file for complete search history.

(56) References Cited

U.S. PATENT DOCUMENTS

| 5,241,702 | A | * | 8/1993 | Dent ............... 455/278.1 |
| 5,402,433 | A | * | 3/1995 | Stiscia ............... 372/31 |
| 5,568,520 | A |   | 10/1996 | Lindquist et al. ....... 375/344 |
| 5,579,347 | A | * | 11/1996 | Lindquist et al. ....... 375/346 |
| 5,608,762 | A |   | 3/1997 | Maddy |
| 5,761,251 | A |   | 6/1998 | Reid |
| 5,835,538 | A | * | 11/1998 | Townshend ............ 375/295 |
| 5,838,735 | A | * | 11/1998 | Khullar .............. 375/319 |
| 5,852,630 | A | * | 12/1998 | Langberg et al. ....... 375/219 |
| 5,878,091 | A |   | 3/1999 | Retzer |
| 5,896,061 | A |   | 4/1999 | Behrent .............. 329/308 |
| 6,006,079 | A |   | 12/1999 | Jaffee et al. .......... 455/310 |
| 6,144,243 | A |   | 11/2000 | Vaisanen ............. 327/307 |
| 6,275,087 | B1 | * | 8/2001 | Dehghan ............. 327/306 |
| 6,370,205 | B1 | * | 4/2002 | Lindoff et al. ........ 375/319 |
| 6,516,183 | B1 | * | 2/2003 | Hellmark ............. 455/78 |
| 6,606,359 | B1 | * | 8/2003 | Nag et al. ........... 375/348 |
| 6,654,596 | B1 | * | 11/2003 | Jakobsson et al. ...... 455/324 |

FOREIGN PATENT DOCUMENTS

| EP | 0 895 385 A | 2/1999 |
| GB | 2 267 629 A | 12/1993 |
| WO | WO97/29552 | 8/1997 |

OTHER PUBLICATIONS

Mouly & Pautet, "The GSM System for Mobile Communications," *The Radio Interface*, pp. 249-259., Jun. 1, 1992.

* cited by examiner

*Primary Examiner*—Ted Wang
(74) *Attorney, Agent, or Firm*—Alston & Bird, LLP

(57) ABSTRACT

A direct conversion receiver uses an algorithm implemented by a DSP to cancel residual DC offsets during demodulation of a GMSK modulated signal. The algorithm exploits the characteristics of GMSK modulation by determining the modulation extremes within sampled I/Q signals and calculates the DC offset as the mean of the extremes. This offset is used to weight a declining exponential function which is subtracted from the original signal samples to achieve compensation.

13 Claims, 5 Drawing Sheets

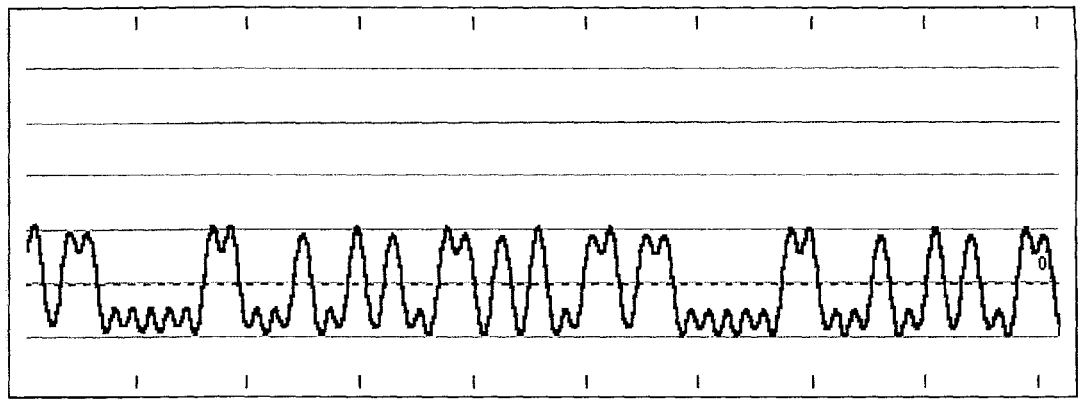
Figure 7
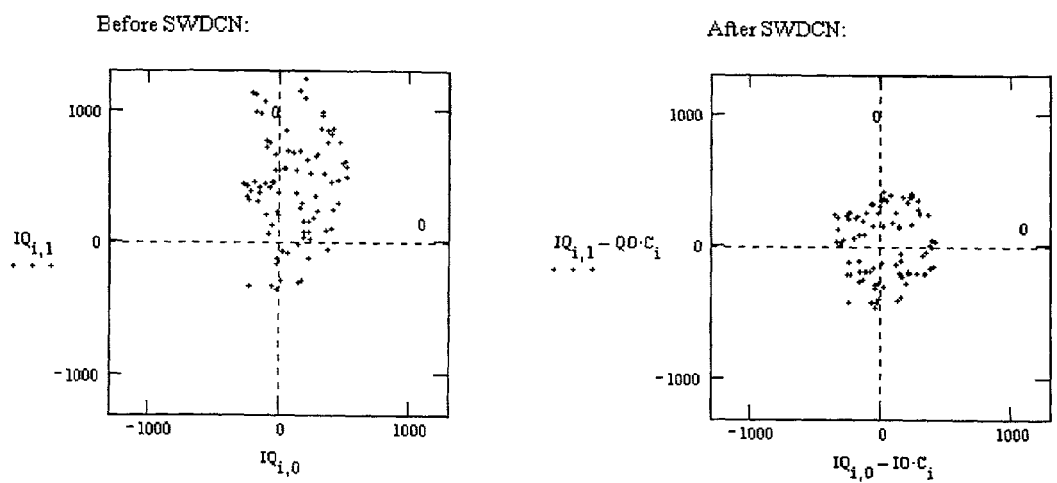
Figure 8a
Figure 8b

DC COMPENSATION IN DIRECT CONVERSION RADIO RECEIVERS

FIELD OF THE INVENTION

This invention relates to the field of direct conversion radio receivers, particularly but not exclusively to a method of DC compensation in a direct conversion receiver.

BACKGROUND

Direct conversion radio receivers, also referred to as zero-IF receivers, inherently suffer from the problem of DC offsets. Sources of DC offset are present in all stages of a direct conversion receiver due to component imbalances and tolerances. Further sources of DC offset include leakage of the local oscillator signal used in the receiver, for example, conduction and/or radiation of the local oscillator signal to the receiver antenna and leakage of the received signal into the local oscillator port of the RF mixers used in the receiver.

In a conventional direct conversion radio receiver operating, for example, in accordance with the GSM standard, which uses GMSK (Gaussian Minimum Shift Keying) modulation, the received signal is coupled to RF mixers which provide a baseband in-phase signal component I and a baseband quadrature signal component Q.

A hardware solution to the DC offset problem is implemented in direct conversion receivers such as that used in the Nokia 6210™ mobile telephone. The fact that the receiver is intended for use with GSM time division multiple access (TDMA) signals has been exploited to incorporate time periods in which the DC component of the I/Q signals can be clamped to zero by a DC cancellation (DCN) circuit. The timing of the DCN periods is controlled to occur in advance of the reception of any received signal burst. The DCN circuits are designed as high pass filters, in which capacitors can be rapidly charged/discharged during the DCN period by electronic switching circuits, to obtain a subtraction of the DC offset in each I or Q channel. The weakness of this solution is that the precision of the DC compensation is dependent on the RF signal received during the DCN period. Because the DCN period lies in the time slot preceding the time slot allocated for the mobile station's own received signal, the signal in the DCN period can range from 0dBm to, for example, more than 30 dB higher than the level in the receive time slot allocated to the mobile station. When the received level in the DCN period is, for example, 30 dB higher than the mobile station's own received signal, the GMSK modulation cannot be averaged sufficiently by the DCN capacitors, resulting in an excessive residual DC content in the I/Q samples of the mobile station's own signal. This in turn results in a poor bit error rate (BER) for the received burst.

The above described problem also prevents direct conversion receivers using the DCN hardware solution from complying with certain tests used in GSM Type Approval, where signals which differ by 20 dB between adjacent time slots are applied to a mobile station.

The present invention aims to address the above problems.

SUMMARY OF THE INVENTION

According to the present invention, there is provided a method of DC compensation for a direct conversion radio receiver, comprising the steps of determining the modulation extremes of a received modulated signal, determining a DC offset for the signal from the modulation extremes; and processing the signal to compensate for the offset.

The DC offset can be determined as substantially the mean of the signal amplitude at the modulation extremes. The modulation extremes can be determined from an inverse filtered signal, where the inverse filtering operation is applied to compensate for the response characteristic of the baseband circuit.

According to the present invention, there is further provided a direct conversion receiver comprising means for determining the modulation extremes of a received modulated signal, means for determining a DC offset for the signal from the modulation extremes; and means for processing the signal to compensate for the offset.

According to the present invention, there is also provided a program to be executed by a digital signal processor in a direct conversion receiver, the receiver comprising a mixer circuit for providing quadrature related signals from a received modulated signal, a dc cancellation circuit for cancelling the dc component in the quadrature related signals and a digital signal processor for removing a residual dc component from the signals, said program being configured to cause the digital signal processor to determine the modulation extremes of the signals, to calculate a dc offset for the signals from the modulation extremes and to process the signals to compensate for the dc offset.

BRIEF DESCRIPTION OF THE DRAWINGS

Embodiments of the invention will now be described, by way of example, with reference to the accompanying drawings, in which:

FIG. 7 shows the I signal after subtraction of a compensating exponential function from the sampled signal;

FIG. 8a is a scattering diagram showing I/Q samples before applying compensation in accordance with the invention; and FIG. 8b is a scattering diagram showing the I/Q samples of FIG. 8a after applying compensation in accordance with the invention.

DETAILED DESCRIPTION

Figure 1:
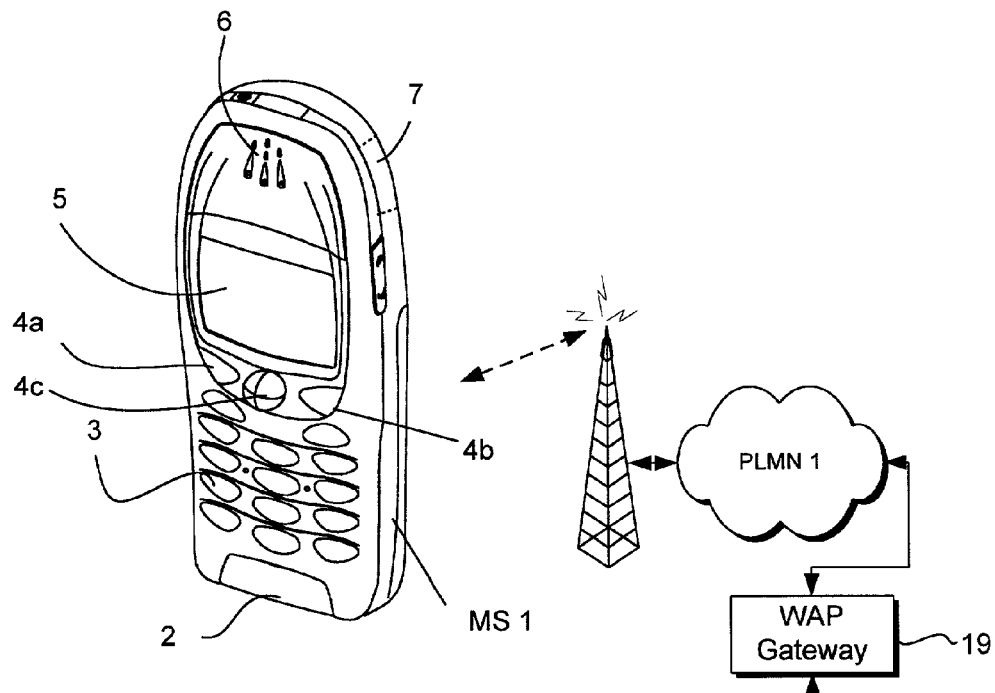
FIG. 1 is a schematic block diagram illustrating a mobile telephone handset and its associated network.

In FIG. 1, a mobile station in the form of a battery driven telephone cellular handset MS1, is shown schematically in radio communication with a public land mobile network PLMN 1.

The mobile handset MS1 includes a microphone 2, keypad 3, further keys comprising soft keys 4a, 4b and a navigation key 4c, a liquid crystal display 5, earpiece 6 and internal antenna 7. The handset 1 is WAP-enabled. The Nokia 6210™ is an example of a WAP-enabled mobile handset.

Figure 2:
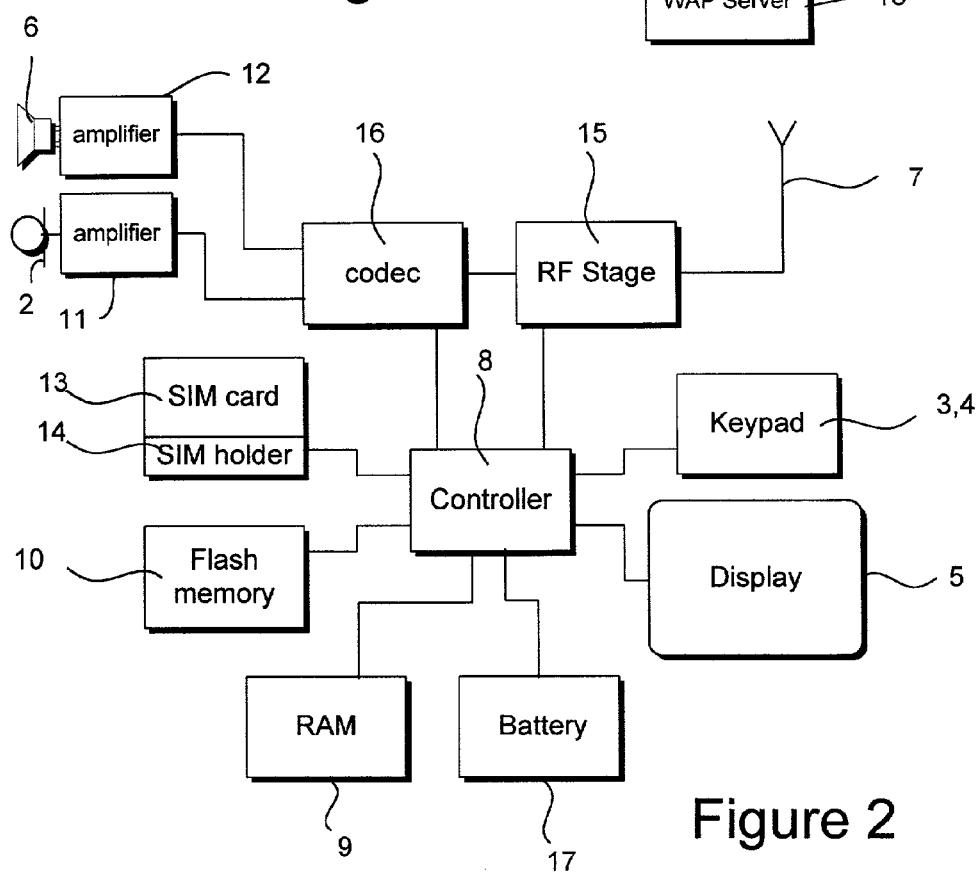
FIG. 2 is a schematic block diagram showing the mobile handset of FIG. 1 in more detail.

The circuitry of the handset 1 is shown in more detail in FIG. 2. Signal processing is carried out under the control of a digital micro-controller 8 which has associated RAM 9 and flash memory 10. Electrical analogue audio signals are produced by microphone 2 and amplified by pre-amplifier 11. Similarly, analogue audio signals are fed to the earpiece 6 through an amplifier 12. The micro-controller receives instruction signals from the keypad 3, soft keys 4a, 4b and navigation key 4c and controls operation of the LCD display 5. The soft-keys 4a, 4b comprise user-programmable keys, while the navigation key 4c comprises, for example, a roller device to perform a scrolling function for the display.

Information concerning the identity of the user is held on a smart card 13 in the form of a GSM SIM card which contains the usual GSM international mobile subscriber identity and encryption K, that is used for encoding the radio transmission in a manner well known per se. The SIM card 13 is removably received in a SIM card holder 14. Radio signals are transmitted and received by means of the antenna 7 connected through an RF stage 15 to a codec 16 configured to process signals under the control of the micro-controller 8.

Thus, in use, for speech, the codec 16 receives analogue signals from the microphone amplifier 11, digitises them into a form suitable for transmission and feeds them to the RF stage 15 for transmission through antenna element 7 to the PLMN 1 shown in FIG. 1. Similarly, signals received from the PLMN 1 are fed through the antenna element to be demodulated by the RF stage 15 and fed to codec 16 so as to produce analogue signals fed to amplifier 12 and earpiece 6.

Figure 3:
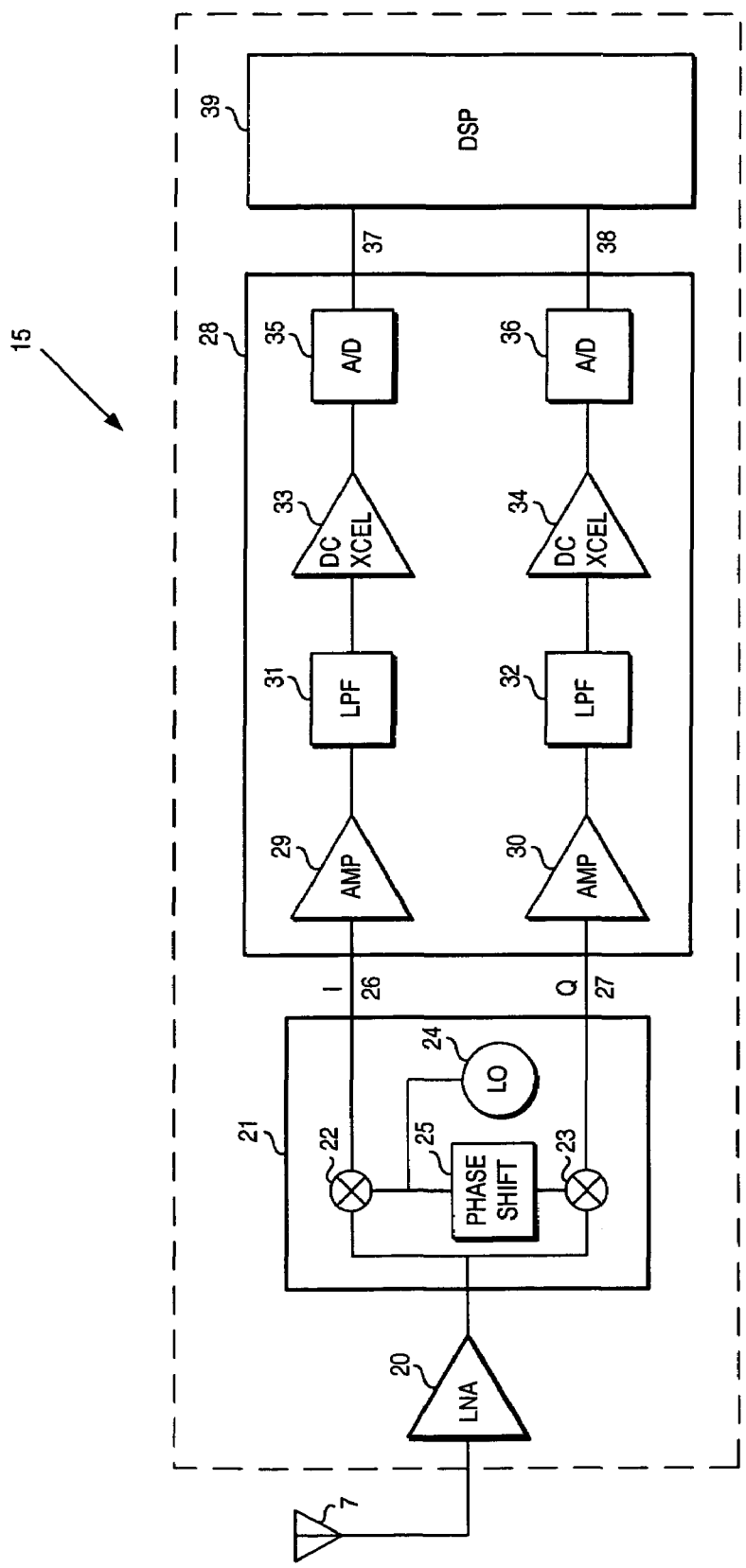
FIG. 3 is a block diagram of a direct conversion radio receiver which forms the RF stage shown in FIG. 2.

Referring to FIG. 3, the RF stage 15 includes a direct conversion receiver, which comprises a low noise amplifier (LNA) 20, which receives input signals from the antenna 7 and the output of which is connected to a mixer circuit 21 which comprises first and second mixers 22, 23, a local oscillator 24 and a 90° phase shifter 25. The output of the LNA 20 is connected to respective first inputs of the first and second mixers 22, 23. The output signal from the local oscillator 24 is connected to a second input of the first mixer 22 and, via the 90° phase shifter 25, to a second input of the second mixer 23. The respective outputs 26, 27 of the mixer circuit 21 are connected to a baseband circuit 28. The baseband circuit 28 comprises respective baseband amplifiers 29, 30, low pass filters 31, 32, DC cancellation circuits 33, 34 and analog-to-digital converters 35, 36. The respective outputs 37, 38 of the baseband circuit are fed to a digital signal processor 39.

The operation of the direct conversion receiver will now be described in detail. As mentioned above, GSM uses a modulation scheme known as Gaussian Minimum Shift Keying (GMSIK). Reference is directed to Mouly & Pautet; "The GSM System for Mobile Communications", pages 249 to 259, for a detailed discussion of the GMSK modulation system for GSM. GMSK modulated signals are received at the antenna 7, amplified by the low noise amplifier 20 and fed to the mixer circuit 21. The mixer circuit 21 uses the well-known technique of multiplying the modulated carrier with the local oscillator signal provided by the local oscillator 24 which has the same frequency as the carrier wave. The resulting outputs 26, 27 comprise a first signal 26 referred to as the in-phase channel I and a second signal 27 referred to as the quadrature channel Q. Taking the example of the I signal, this is amplified by a baseband amplifier 29 and filtered by a low pass filter 31. DC cancellation is then applied by a DC cancellation circuit (DCN) 33, and the resulting signal is digitised by the analog-to-digital converter 35 and fed to the DSP 39. The Q signal is processed in an exactly analogous way which is therefore not described separately. As mentioned previously, the DCN circuits 33, 34 are effectively high-pass filters, in which capacitors can be rapidly charged/discharged by electronic switching circuits during selected DCN periods, to obtain a subtraction of the DC offset in each of the I and Q channels. For example, during a DCN period, the received signal is used to rapidly charge a capacitor in the DCN circuit to a value which represents the DC content of the signal, so that the output of the DCN circuit during the following burst period, when the DCN function is deactivated, is compensated by the offset measured during the DCN period.

The I and Q samples received by the DSP 39 are still distorted by residual DC content as a result of insufficient DC cancellation in the DC cancellation circuits 33, 34. Additional DC compensation is therefore provided in the DSP software, which implements a DC cancellation algorithm, shown schematically in FIG. 4.

A characteristic of GMSK modulation is that for a limited number N of I/Q samples, there is a sufficiently high probability that the I/Q vector has been positioned in all of the possible constellation points, or in other words that both the I and Q signals will have been in their modulation extremes. A modulation extreme results from a large number of successive repetitions of the same symbol in the original NRZ (Non-Return-to-Zero) sequence to be transmitted. By finding the modulation extremes over N samples for each of the I and Q channels, the DC content can be calculated as the mean of the two extremes.

In the example described above, the receiver hardware is found to exhibit a high pass filter characteristic. As a result, the DC component in this example is a declining function; the DC content being largest at the start of the burst and zero at the end of the burst.

Figure 4:
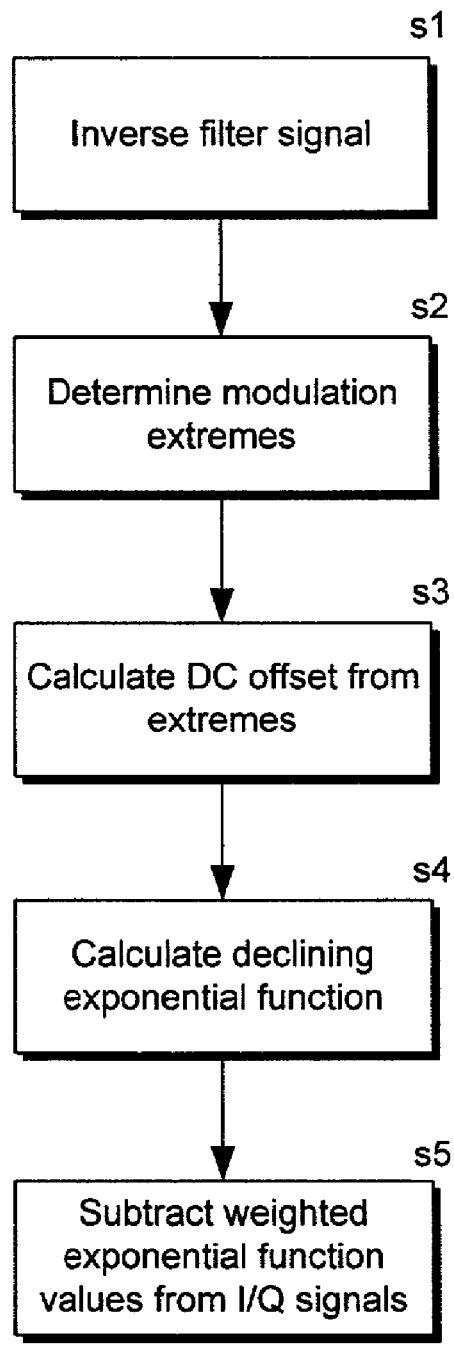
FIG. 4 is a flow diagram illustrating the DC cancellation algorithm according to the invention.
Figure 5:
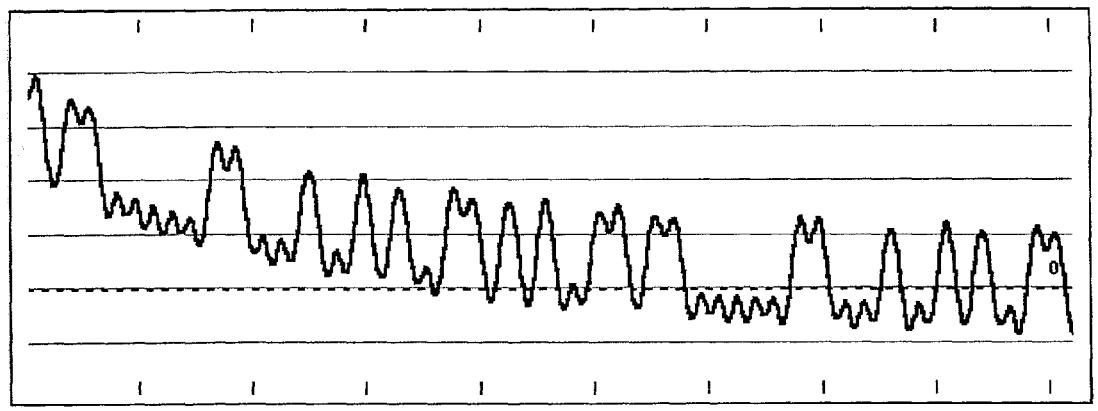
FIG. 5 shows a distorted I signal.

FIG. 5 shows a distorted I signal from which the modulation extremes need to be determined. Referring to FIGS. 4 and 5, the signal is first filtered to straighten it, by applying an inverse filter to counteract the effect of the hardware high-pass filter characteristic (step s1).

Assuming that the high pass characteristics of the hardware can be modelled as a first order high-pass filter of the form:

$$H(s) = \frac{s}{s + 1/RC}$$

where RC denotes the effective RC product of the receiver circuit, then the inverse filter is implemented in the digital domain as:

$$S(z) = \frac{1 - \tau z^{-1}}{1 - z^{-1}}$$

where τ is a direct matched z—transform of the zero which cancels the single pole in H(s), and $$\tau = e^{-1/RC*fs}$$

where fs is the sample frequency.

The inverse filter is implemented in the DSP 39 as:

$$y = x - \tau x z^{-1} + y z^{-1}$$

The constant τ is tuned to a value representative of the components used in the direct conversion receiver hardware. With normal component tolerances, the value need only be determined once for each particular type of mobile station. For example, for the Nokia 6210™, the following values are used:

$$RC = 1.349 \times 10^{-4}, \tau = 0.973$$

Figure 6:
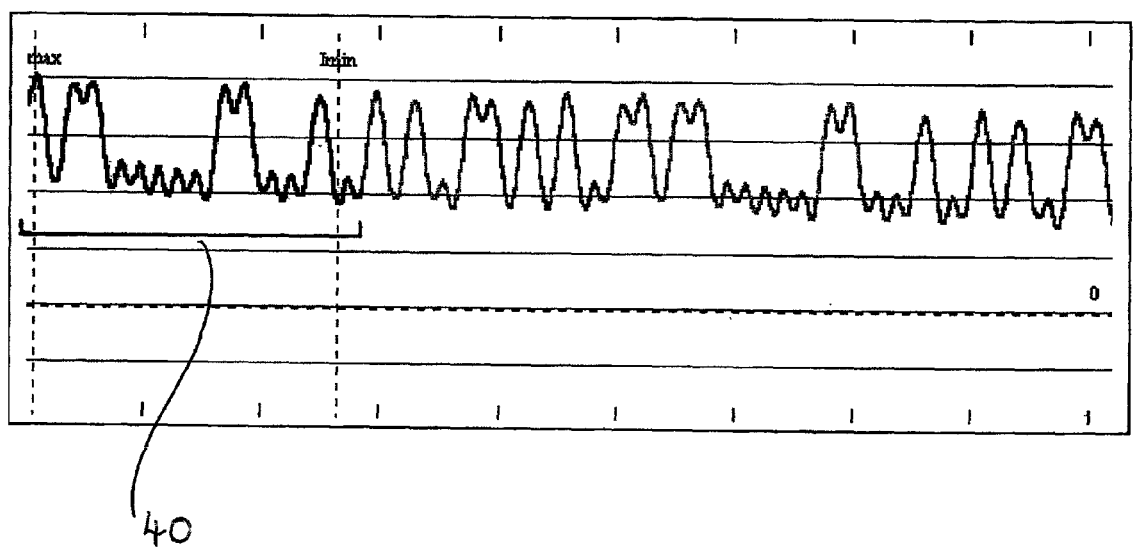
FIG. 6 shows a filtered I signal.

FIG. 6 shows the result of applying the inverse filter to the signal shown in FIG. 5, at a sample rate which equals the symbol rate. In this example, only the first 64 samples in the burst are inverse filtered, as indicated by the window 40. 64 samples have been found to be a sufficiently high number to obtain the required probability of finding the modulation extremes. Although it is possible to scan a longer part of the burst to increase the chances of finding the true modulation extremes, such scanning requires a very accurate match of the inverse filter. If the match is not very accurate, a drift in the DC level can occur which increases for samples taken progressively further from the start of the burst.

The modulation extremes are then determined (step s2), being the signal amplitude values I_max and I_min within the 64 sample window 40 shown in FIG. 6. The determined values are used to calculate the DC offset for the I channel (step s3):

$$I\_offset = \frac{I\_max + I\_min}{2}$$

A similar procedure is carried out for the Q channel, resulting in a value of the offset for the Q channel (step s3):

$$Q\_offset = \frac{Q\_max + Q\_min}{2}$$

As mentioned above, the high pass characteristics of the receiver hardware lead to the DC component in this example being a declining exponential function, so that compensation is performed by subtracting a weighted declining exponential function from the I/Q samples in the DSP, the algorithm providing an accurate determination of the initial DC content in the samples in the received burst and therefore the weighting for the exponential function.

The value of τ determined above is also used for the calculation of the declining exponential function used for compensation of the I/Q samples (step s4):

Exponential function:

$$E_n = E_{n-1} \cdot \tau$$

where $E_0 = 1$

Values to be subtracted from I samples:

$$IO_n = I\_offset \cdot E_n$$

The compensated I signals are determined by subtracting the weighted declining exponential function values from the original I samples (step s5):

$$I_{comp} = I_n - IO_n$$

FIG. 7 shows the compensated I signal $I_{comp}$ after subtraction of $IO_n$ from the samples.

The Q signal is treated in an entirely analogous way to provide a compensated Q signal $Q_{comp}$.

FIG. 8a is a scattering diagram of the I/Q samples without applying compensation in accordance with the invention. FIG. 8b is a scattering diagram of the same samples after processing by the algorithm, illustrating the significant decrease in sample scattering observed in accordance with the invention.

In principle, it is also possible to subtract the determined DC offset values from the inverse filtered signal to obtain the final compensated I/Q signals, which can also enable the bandwidth reduction introduced by the hardware high-pass filter to be eliminated.

While the above example has been described in relation to a receiver having a first order high-pass characteristic, the receiver can have a baseband characteristic of a higher order. For such a receiver, a corresponding higher order inverse filter is applied in the DSP in order to straighten the signal to enable the modulation extremes to be determined.

Furthermore, for receivers which do not exhibit a high pass characteristic, there is a constant residual DC content in the signal received during the burst period. In this case, the inverse filtering operation is not required and compensation is achieved by subtracting a fixed DC level, rather than a declining exponential DC-level, from the received samples.

It will be appreciated that, once compensated I/Q values are available, subsequent processing is applied to correctly demodulate the GMSK signals and recover the original transmitted data, in a manner which is well known per se.

While the invention has been described in relation to GMSK modulation, the skilled person would appreciate that the principles could be applied to various other types of modulation, in particular constant amplitude modulation schemes, including for example the proposed 8 PSK modulation scheme in the GSM EDGE evolution.

The invention claimed is:

1. A method of DC compensation for a direct conversion radio receiver having an effective filter characteristic representing its frequency response, comprising:
   applying an inverse filter characteristic to a received modulated signal over a predetermined number of samples to compensate for the effect of the effective filter characteristic;
   determining the modulation extremes of the filtered signal by determining minimum and maximum signal amplitudes over the predetermined number of samples; and
   determining a DC offset for the signal from the modulation extremes; and processing the signal to compensate for the offset.

2. A method according to claim 1, comprising determining the DC offset as substantially the mean of the signal amplitude at the modulation extremes.

3. A method according to claim 1, wherein the step of processing the signal comprises subtracting the offset from the signal.

4. A method according to claim 1, wherein the step of processing the signal comprises subtracting a weighted exponential function from the signal.

5. A method according to claim 4, wherein the weighting of the exponential function comprises the determined DC offset.

6. A method according to claim 1, wherein the signal comprises an in-phase component of a modulated signal.

7. A method according to claim 1, wherein the signal comprises a quadrature component Q of a modulated signal.

8. A method according to claim 1, wherein the signal is GMSK modulated.

9. A computer readable medium encoded with a computer program executable by a computer which, when run on a processor, carries out the steps of claim 1.

10. A method according to claim 1, wherein the effective filter characteristic of the radio receiver is a high pass filter characteristic.

11. A direct conversion receiver having an effective filter characteristic representing its frequency response comprising:
    inverse filter means for applying an inverse filter characteristic to a received modulated signal over a predetermined number of samples to compensate for the effective filter characteristic;
    means for determining the modulation extremes of the filtered signal by determining minimum and maximum signal amplitudes over the predetermined number of samples;

means for determining a DC offset for the signal from the modulation extremes; and means for processing the signal to compensate for the offset.

12. A computer readable medium encoded with a computer program executable by a computer which, when run on a digital signal processor in a direct conversion receiver having an effective filter characteristic representing its frequency response, the receiver comprising an inverse filter circuit for applying an inverse filter characteristic to a received modulated signal over a predetermined number of samples to compensate for the effect of the effective filter characteristic, a mixer circuit for providing quadrature related signals from the signal, a DC cancellation circuit for cancelling the DC component in the quadrature related signals and a digital signal processor for removing a residual DC component from the signals, said program being configured to cause the digital signal processor to determine the modulation extremes of the signals by determining minimum and maximum signal amplitudes over the predetermined number of samples, to calculate a DC offset for the signals from the modulation extremes and to process the signals to compensate for the DC offset.

13. A direct conversion radio receiver having an effective filter characteristic representing its frequency response including a digital signal processor for processing a received modulated signal, the digital signal processor being configured to apply an inverse filter characteristic over a predetermined number of samples to compensate for the effect of the effective filter characteristic, determine the modulation extremes of the filtered signal by determining minimum and maximum signal amplitudes over the predetermined number of samples, determine a DC offset for the signal from the modulation extremes and to process the signal to compensate for the offset.

* * * * *